United States Patent [19]
Zelt, III et al.

[11] Patent Number: 5,926,558
[45] Date of Patent: Jul. 20, 1999

[54] METHOD AND APPARATUS FOR MONITORING AND INSPECTING ROTARY KNIVES

[75] Inventors: Albert R. Zelt, III, Bethel Park; Robert M. Klawonn; Paul S. Laskey, both of Pittsburgh, all of Pa.

[73] Assignee: Asko, Inc., West Homestead, Pa.

[21] Appl. No.: 08/583,454

[22] Filed: Jan. 5, 1996

[51] Int. Cl.⁶ .................................................. G06K 9/00
[52] U.S. Cl. .................... 382/152; 348/130; 364/474.21; 364/474.34
[58] Field of Search .................................. 382/100, 108, 382/141, 152, 199, 204; 348/82, 86, 88, 92, 125, 128, 129, 130; 364/474.15, 474.17, 474.16, 474.19, 474.21, 474.34, 507, 551.01, 551.02; 356/237, 374, 376, 396; 83/33, 72, 76.1, 76.9; H04N 7/00, 7/18, 13/00

[56] References Cited

U.S. PATENT DOCUMENTS

| | | | |
|---|---|---|---|
| 3,312,135 | 4/1967 | Mraz | 83/675 |
| 3,730,043 | 5/1973 | Zimmermann | 83/502 |
| 4,539,561 | 9/1985 | Wulff | 348/128 |
| 4,667,550 | 5/1987 | Eiting | 83/56 |
| 4,700,224 | 10/1987 | Miyasaka et al. | 382/152 |
| 4,845,763 | 7/1989 | Bandyopadhyay et al. | 382/152 |
| 4,878,114 | 10/1989 | Huynh et al. | 382/108 |
| 5,115,403 | 5/1992 | Yoneda et al. | 364/474.15 |
| 5,132,791 | 7/1992 | Wertz et al. | 348/128 |
| 5,255,199 | 10/1993 | Barkman et al. | 364/474.17 |
| 5,361,308 | 11/1994 | Lee et al. | 382/204 |

OTHER PUBLICATIONS

"Improved Coil Slitting Cutters", Sheet Metal Industries, Mar. 1973. 2 pages not numbered.

*Primary Examiner*—Christopher S. Kelley
*Attorney, Agent, or Firm*—Reed Smith Shaw & McClay LLP

[57] ABSTRACT

A method of monitoring and inspecting one or more operational characteristics of a knife includes providing at least one image producer having a field of view that substantially frames the knife, using the at least one image producer to form a first series of images of the knife while the knife is in use, and analyzing the first series of images to determine whether the one or more operational characteristics of the knife are within one or more preliminary operating parameters.

29 Claims, 7 Drawing Sheets

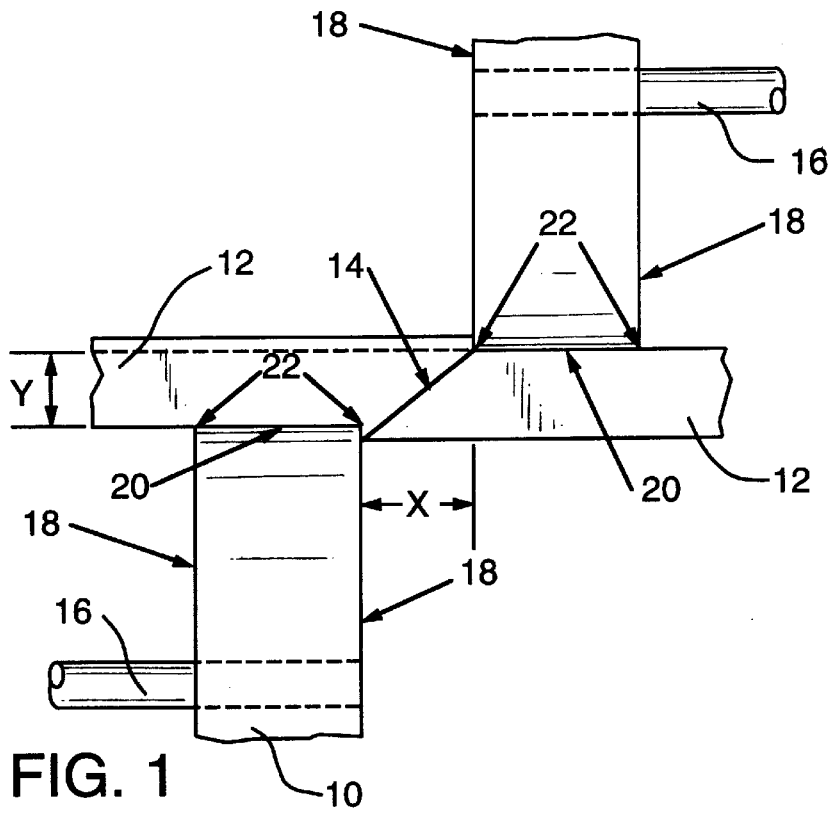
FIG. 1
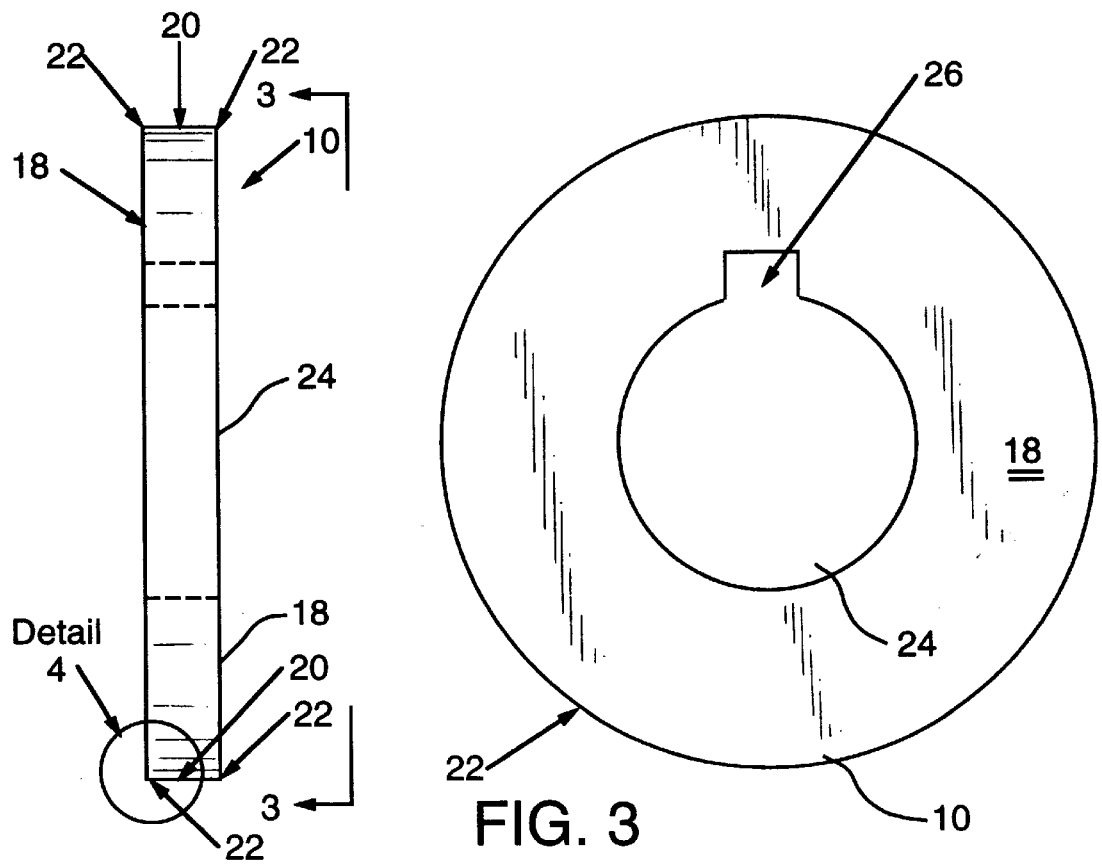
FIG. 2
FIG. 3

METHOD AND APPARATUS FOR MONITORING AND INSPECTING ROTARY KNIVES

BACKGROUND OF THE INVENTION

The present invention relates generally to rotary knives and, more specifically, to an apparatus and method for monitoring and inspecting in real time the various operational characteristics of rotary knives.

Rotary knives are used in the metals industry for, among other things, slitting and edge trimming strip-metal coils. In a slitting operation, any suitable number of rotary knife pairs may be used to cut a wide, coiled, metal strip into a corresponding number of narrower strips. In edge trimming operations, two pairs of rotary knives are used to trim a metal strip of, usually, non-uniform width to a desired width.

Various operational characteristics of the rotary knives can markedly influence the quality of the strip metal edges formed by slitting or edge-trimming operations. For example, reduced sharpness and integrity, and increased wear, of a rotary knife's edge can result in poor quality edges. In addition, the respective positioning of the rotary knives within each pair (e.g., vertical and horizontal clearance), is important to strip-edge quality. Moreover, the concentricity and run-out (i.e., wobble) of individual knives can affect the quality of edge produced.

Conventionally, the setting and positioning of rotary knives, and the quality of their edges, are visually monitored and manually controlled by line operators. Through the collection of empirical data, many line operators have been able to determine "best average" knife settings for their various products. However, despite this knowledge, deteriorating knife-edge quality and incorrect knife settings frequently go undetected until significant amounts of strip metal have been cut or otherwise processed. The poor edge quality of metal strip resulting from delays in recognizing the deterioration of knife edge quality and/or knife settings or positioning can cause significant increases in reprocessing costs, reduced yields and scrap rate.

SUMMARY OF THE INVENTION

The present invention provides a method and apparatus for analyzing, in real time, the edge sharpness and various other operational characteristics of rotary knives. By continuously monitoring in real time one or more of the operational characteristics of rotary knives, the knives can be timely adjusted or replaced when they begin to operate outside of normal operating parameters, thereby preventing the unnecessary scrapping or subsequent re-working of product.

According to a first aspect of the present invention, a method of monitoring and inspecting one or more operational characteristics of a knife includes the following steps: providing at least one image producer having a field of view that substantially frames the knife; using the at least one image producer to form a first series of images of the knife while the knife is in use; and analyzing the first series of images to determine whether the one or more operational characteristics of the knife are within one or more preliminary operating parameters.

According to a dependent aspect of the present invention, the step of analyzing includes: generating a first series of outputs from the first series of images; comparing the first series of outputs to the one or more preliminary operating parameters; determining whether the one or more operational characteristics of the knife are within the one or more preliminary operating parameters; and taking corrective action if the one or more operational characteristics of the knife are not within the one or more preliminary operating parameters.

According to another dependent aspect of the present invention, the method of monitoring and inspecting further includes: forming one or more subsequent series of images of the knife while the knife is in use; generating one or more subsequent series of outputs from the one or more subsequent series of images; analyzing the one or more subsequent series of outputs to determine whether the one or more operational characteristics of the knife are within the one or more preliminary operating parameters; and using the first series of outputs and the one or more subsequent series of outputs to generate one or more standard operating parameters if the one or more operational characteristics of the knife are within the one or more preliminary operating parameters.

According to a second aspect of the present invention, an apparatus for monitoring and inspecting one or more operational characteristics of a knife includes at least one image producer having a field of view that substantially frames the knife. The at least one image producer is operable to form a first series of images of the knife while the knife is in use. In addition, the apparatus includes an analyzer that is connectively associated with the at least one image producer. The analyzer is operable to determine in real time whether the one or more operational characteristics of the knife are within one or more preliminary operating parameters.

According to a third aspect of the present invention, a method of monitoring and inspecting one or more operational characteristics of a knife includes the following steps: providing at least one image producer having a field of view that substantially frames an edge of a workpiece that has been processed by the knife; using the at least one image producer to form a first series of images of the workpiece edge after the edge has been processed by the knife; and analyzing the first series of images to determine whether the one or more operational characteristics of the knife are within one or more preliminary operating parameters.

According to a fourth aspect of the present invention, an apparatus for monitoring and inspecting one or more operational characteristics of a knife includes at least one image producer having a field of view that substantially frames an edge of a workpiece that has been processed by the knife. The at least one image producer is operable to form a first series of images of the workpiece edge after the edge has been processed by the knife. An analyzer is connectively associated with the at least one image producer to determine in real time whether the one or more operational characteristics of the knife are within one or more preliminary operating parameters.

By continuously monitoring and inspecting the operational characteristics of rotary knives, line operators will be able to develop standard operating parameters for their knives in relation to specific strip stock and processing therefor. As a result, operators may be able to anticipate knife wear and other degrading operational characteristics, and consequently develop schedules for adjusting and/or replacing rotary knives before poor edge-quality occurs in processed metal strip.

The present invention, together with further objects and attendant advantages, will best be understood by reference to the following detailed description taken in conjunction with the accompanying drawings.

BRIEF DESCRIPTION OF THE DRAWINGS

FIG. 1 is an operational view of a pair of rotary knives processing a metal strip.

FIG. 2 is an end elevational view of a rotary knife shown in FIG. 1.

FIG. 3 is a side view taken along line 3—3 of FIG. 2.

DETAILED DESCRIPTION OF THE PRESENTLY PREFERRED EMBODIMENTS

Figure 4:
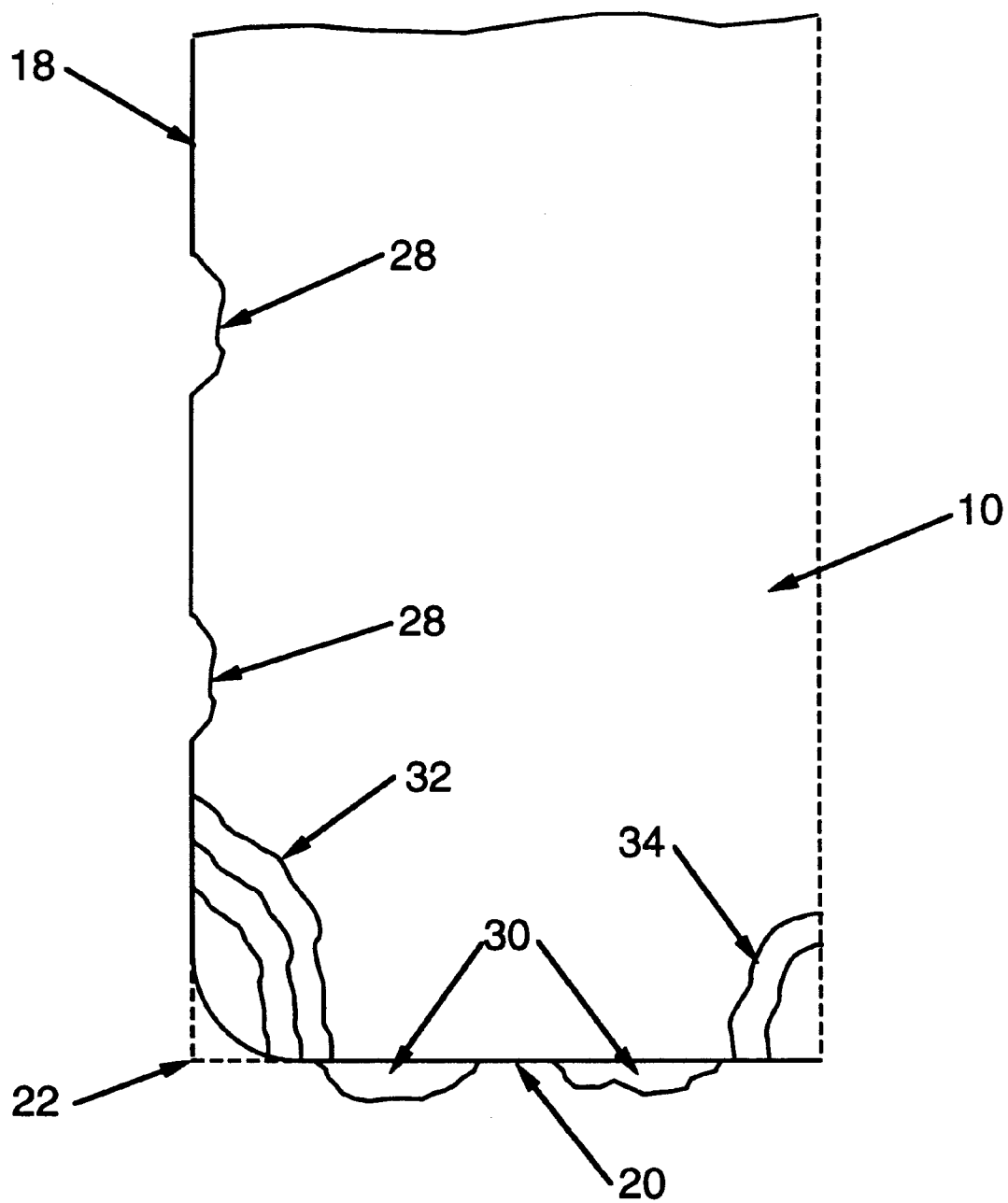
FIG. 4 is an enlarged view of Detail 4 of FIG. 2.

The present invention is described below in terms of an edge trimming operation for metal strip. However, it should be understood that the apparatus and method of the present invention may be adapted for use in any suitable operation wherein knives are used to process workpieces.

Turning now to the drawings, FIG. 1 shows a pair of rotary knives 10 in operational contact with a metal or other strip 12 to create a new edge 14 therefor. As shown, the knives 10 are positioned with respect to each other such that a vertical clearance Y and a horizontal clearance X is defined therebetween.

Each of the knives 10 is supported by a shaft 16 that is, in turn, mounted in a support block or arbor (not shown) by means of, for example, roller bearings. The strip 12 is typically disposed between the support blocks and is fed between the knives 10.

As best shown in FIGS. 2 and 3, a rotary knife 10 typically comprises a disk-shaped member having two substantially parallel sides 18 defining an end 20 therebetween. The sides 18 and the end 20 of the knife 10 cooperate to define two cutting edges 22.

As shown in FIG. 3, the knife 10 further includes a bore 24 disposed therethrough. The bore 24 defines a keyway 26, which engages a mating key (not shown) formed on the shaft 16 to lock the knife 10 to the shaft 16 and to insure that the knife 10 and the shaft 16 rotate together.

A variety of the operational characteristics that are important to the proper functioning of a rotary knife 10 are illustrated in FIG. 4. As shown therein, knife edge sharpness may degrade in time, from the sharp edge 22 shown in dotted lines to the rounded, dull edge shown in full lines.

Further, the knife edge 22, even though sharp, may become worn, as depicted by wear lines 32, 34. As shown in FIG. 4, knife edge 22 wear is manifested by the edge 22 receding into the sides 18 of the knife 10. The edge 22 of a knife 10 can become worn for a variety of reasons, including a too narrow horizontal clearance (see Dimension X in FIG. 1) between knives.

In addition, the integrity of the knife edge 22 may be compromised by defects 28 therein. These defects 28 in the knife edge 22 are usually caused by pieces of the knife 10—i.e., "chips" —breaking off, or by stress or heat cracks forming therein.

Moreover, the end 20 and/or sides 18 of the knife 10 may collect material fragments 30 thereon from the strip 12. When the strip 12 and knives 10 move at different linear speeds during a trimming or slitting operation, friction develops therebetween and the knives 10 may excessively heat, which often results in material fragments 30 from the strip being deposited onto the knife 10. In addition, excess knife heat can cause the knife edge 22 to dull, heat cracks to form in the knife edge 22 and the finish of the strip 12 to be marred.

As described below, the above-noted operational characteristics of a knife 10 can be monitored and inspected in real time to warn a line operator that a knife 10 is wearing or otherwise degrading, and needs to be replaced.

Figure 5:
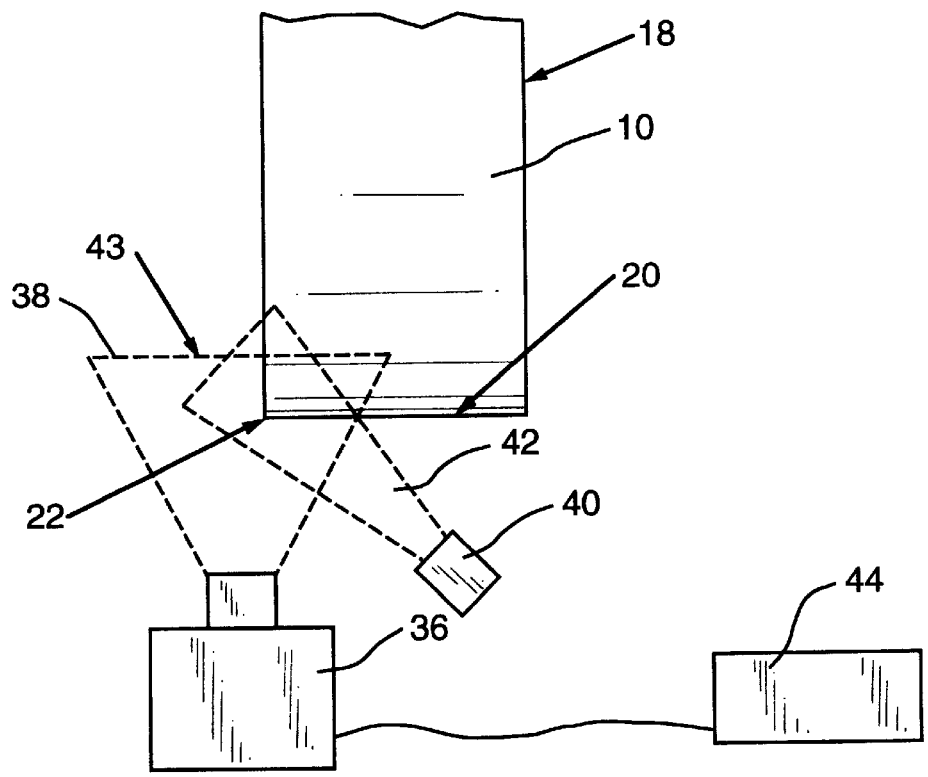
FIG. 5 is a schematic view of a first preferred embodiment of the present invention used to analyze the edge characteristics of a rotary knife.
Figure 6:
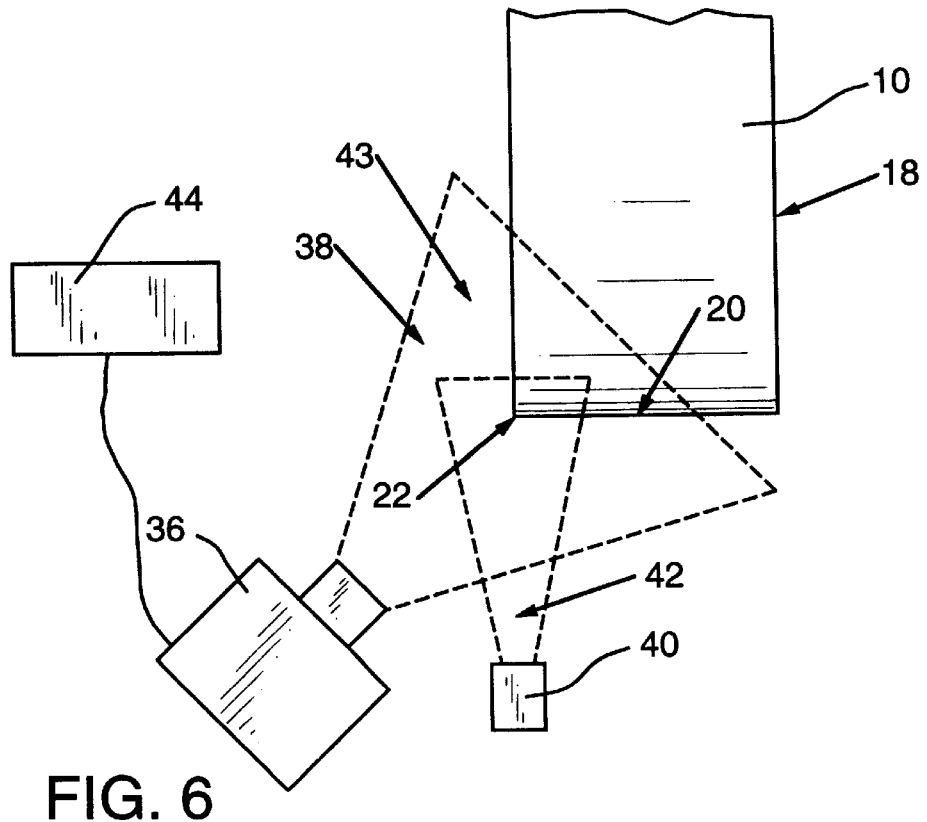
FIG. 6 is a schematic view of a second preferred embodiment of the present invention used to analyze the edge characteristics of a rotary knife.

FIGS. 5 and 6 illustrate two preferred embodiments of the present invention. Both FIGS. 5 and 6 are intended to be similar, if not identical, to the set-up shown in FIG. 1. However, for clarity and ease of illustration, it should be understood that the second knife 10 and the strip 12 have been removed.

As will become apparent below, FIG. 6 differs from FIG. 5 only in the positioning of the image producer 36, light source 40 and analyzer 44. It should be appreciated that, depending on the specific operational characteristics of the knife 10 being monitored, the image producer 36 and the light source 40 may be positioned in various orientations to frame different areas of the knife 10.

As shown in FIG. 5, an image producer 36, such as a video camera, is positioned such that its field of view 38 substantially frames the edge 22 and the end 22 of a knife 10. In addition, a light source 40 focuses an intense light beam 42 on the edge 22 and at least a portion of the end 20 of the knife 10. The rest of the beam 42 extends into the relatively dark or "black" area of the background environment 43.

Typically, the end 20 of the knife 10 has a finished and polished surface. Therefore, the end 20 is able to reflect a large portion of the light beam 42 that strikes it. The contrast between the reflectivity of the knife end 20 and the relative non-reflectivity of the background environment 43 is utilized to provide the monitoring and inspection apparatus and method of the present invention.

As the knife 10 rotates during operation, the image producer 36 creates a series of real-time images of the edge 22 and the end 20 of the knife 10. The real-time images of the knife 10 contain "bright" areas that correspond to the knife end 20 and edge 22. The "bright" areas are caused by the portion of the light beam 42 that is reflected by the knife end 20 and edge 22. In addition, the images contain "dark" areas that correspond to the background environment 43. The "dark" areas are caused by the portion of the light beam 42 that is absorbed (i.e., not reflected) by the background environment 43.

As is known in the art, each of the images of the knife 10 formed by the image producer 36 is divided into a number of pixels. For example, a standard "frame grabber" forms images having 512 pixels along the horizontal and 512 pixels along the vertical. Thus, the images formed by the image producer 36 will be divided into a large number of "bright" pixels and a large number of "dark" pixels, with a relatively few number of "gray" pixels that define the transition between the knife 10 and the background environment 43—i.e., the knife edge 22.

The images produced by the image producer 36 are supplied to an analyzer 44, which may be a PC-type computer. Although not shown, the analyzer 44 may include peripherals connected thereto, including one or more display monitors, a keyboard and/or a trackball for operator use and interaction with the monitoring and inspection apparatus.

As discussed in greater detail below, the analyzer 44 is programmed to digitize the images of the strip 12 and to, initially, compare the digitized image information for the one or more operational characteristics of the knife 10 being monitored to a set of preliminary operating parameters.

The preliminary operating parameters for the knife 10 may be derived from the line operator's own experience in processing the specific strip stock in issue. For example, by forming images of a new and correctly positioned knife operating on the line, and comparing those images with other images formed for a known, worn and, possibly, poorly-positioned knife operating on the same line, a line operator may be able to broadly define a set of preliminary operating parameters for various operational characteristics of the knife.

If the digitized image information falls outside of the preliminary operating parameters, the analyzer 44 alerts the line operator. The knife 10 may then be repositioned, either automatically or manually, or replaced, depending on the specific operational characteristic in issue (e.g., edge sharpness) or the severity of the problem. If the digitized information falls within the preliminary operating parameters, the knife 10 is permitted to continue in use and the image information is stored and subsequently used to generate a standard set of operating parameters for that particular strip 12 and process. Suitable software for handling this information processing will be apparent to those in the data processing art, and does not directly form a part of the present invention. One suitable image processing software is available from Integral Vision Limited of Woburn Industrial Estate, Kempston, Bedford, Great Britain.

To describe the present invention in greater detail, one of the operational characteristics discussed above with respect to FIG. 4—edge sharpness—will be discussed below.

Figure 7A:
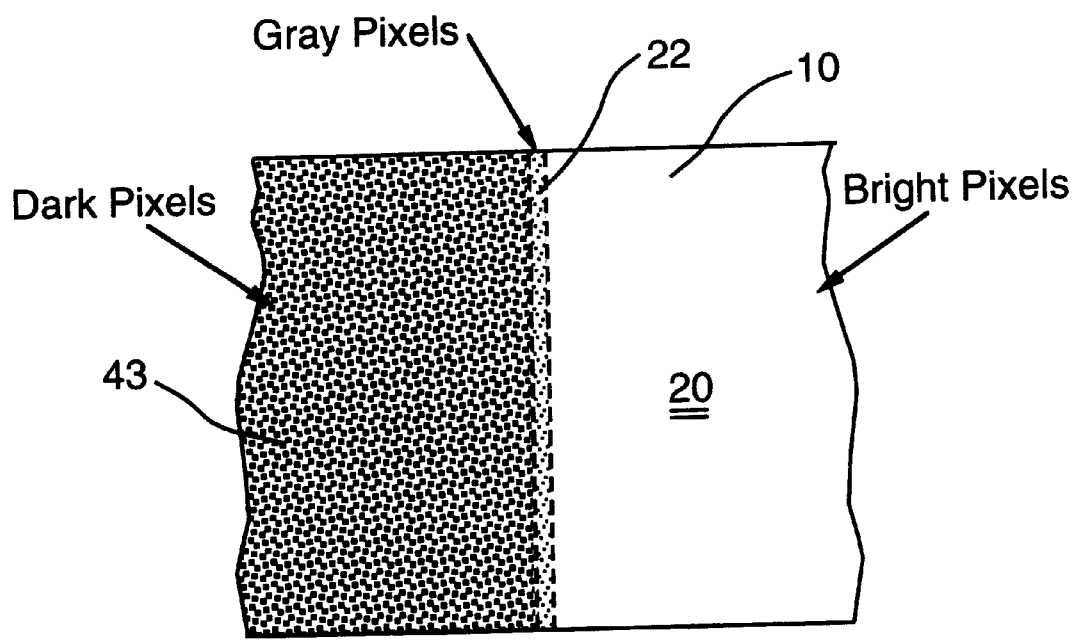
FIG. 7a is a diagrammatic view of a representative image of a sharp-edged rotary knife that may be formed according to the present invention.

As shown in FIG. 7a and referring generally to FIG. 5, when the knife 10 is new and, thus, has a sharp edge 22, the ratio between gray pixels and bright and dark pixels will be very small—i.e., the transition between the bright and dark areas of the images will be defined by a gray band of pixels that is very narrow as compared to the band-width of the bright and dark pixels. This narrow band-width of the gray pixels is due, in FIGS. 5 and 7a, to the sharp edge 22 of the knife 10; the sharp edge 22 causes a sharp transition between the reflective end 20 of the knife 10 and the non-reflective area of the background environment 43.

Figure 7B:
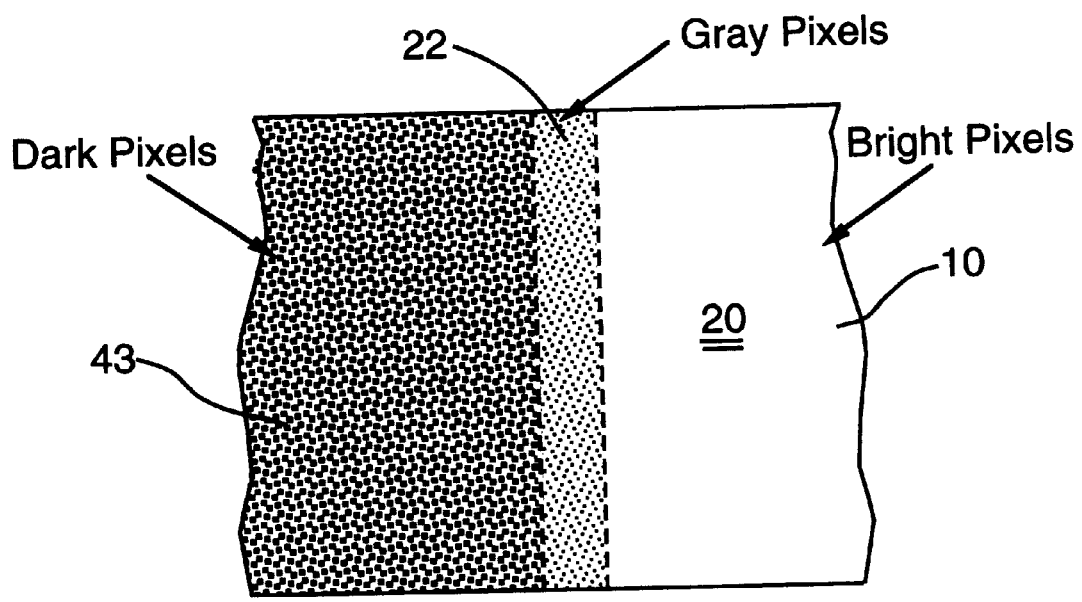
FIG. 7b is a diagrammatic view of a representative image of a dull-edged rotary knife that may be formed according to the present invention.

As the knife edge 22 dulls, it becomes rounded (see the edge 22 in FIG. 4). Consequently, as shown in FIG. 7b, the transition between the bright and dark areas of the images becomes less pronounced and, thus, the band-width of the gray pixels increases.

The analyzer 44 continuously monitors in real time the images of the knife edge 22 being formed by the image producer 36, and compares those images to a set of preliminary operating parameters for knife edge 22 sharpness derived by the line operator.

As discussed above, if the digitized image information falls within the preliminary operating parameters for knife edge sharpness (i.e., the band-width of the gray pixels is within a predetermined range), and the operator independently confirms that the knife edge 22 and strip 12 appear to be in good order, the knife 10 will be allowed to continue in use.

However, if the analyzer 44 determines that the image information is not within the preliminary operating parameters for knife edge sharpness (i.e., the band-width of the gray pixels is too large as compared to the band-widths of the bright and dark pixels), the analyzer 44 will alert the line operator and possibly stop production. The line operator will then independently determine whether the knife edge has become sufficiently dull such that the knife 10 should be replaced. If the knife 10 does need to be replaced, the image information that caused the alert to be given can be utilized by the analyzer 44 to narrow and thereby refine the preliminary operating parameters, as discussed below.

It is anticipated that the above-described iterative process will in time result in standard operating parameters being defined for the various operational characteristics of the knife 10. As the standard operating parameters are formed, the line operators will be able to rely on them exclusively to determine when the knives 10 in a line operation need to be repositioned or replaced.

The remaining operational characteristics of the knife 10 as depicted in FIG. 4 will now be discussed. As shown therein and discussed above, the integrity of the knife edge 22 may be compromised by defects 28 therein. In the images of the knife edge 22 formed by the image producer 36, such defects or "chips" would appear instantaneously in the images—i.e., as soon as the material chip fell away from the edge 22—as a deviation between the normal pixel position of the edge 22 and the distorted, real time, position thereof. Thus, the analyzer 44 can be programmed to recognize that if the normal pixel position of the edge 22 changes drastically in a short period of time then it is likely that a "chip" is missing from the knife edge 22, and that the knife 10 should be replaced.

In addition, the apparatus of the present invention can be used to detect the presence of strip material fragments on the end 20 or the sides 18 of the knife. When located on the knife 10, the material fragments will appear as relatively dark pixels on the images of the knife 10. These dark pixels will appear in an area of generally bright pixels corresponding to the reflective surfaces of the knife 10. When the analyzer 44 recognizes the dark pixels as representing material fragments, the analyzer 44 will alert the line operator, who will then clean the knife 10 of the fragments or replace the same.

Further, the present invention can be used to identify wear on the edges 22 of the knife 10. As shown in FIGS. 5 and 6, a new knife 10 has two substantially parallel sides 18 that are each substantially normal to the end 20 thereof. In the images of the knife formed by the image producer 36, portions of the end 20 and at least one side 18 will appear therein as substantially perpendicular lines. Over time, the edges 22 of the knife 10 will wear, as illustrated by the wear lines 32, 34 in FIG. 4. The analyzer 44 will be able to recognize the change in pixel orientation of the sides 18 and end 20 lines of the knife 10 caused by the wear, and will alert the line operator of such.

Figure 8:
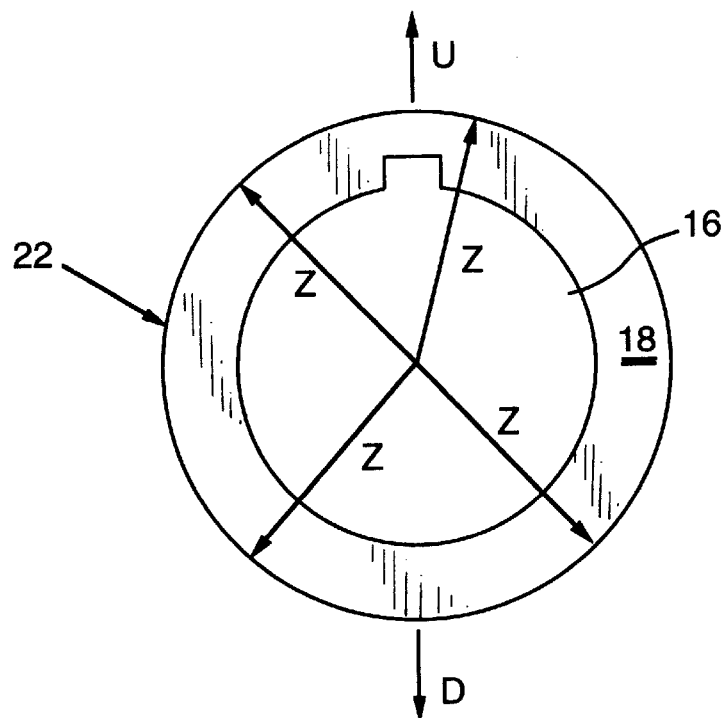
FIG. 8 is a side view of a rotary knife illustrating the concentricity operational characteristic thereof.
Figure 9:
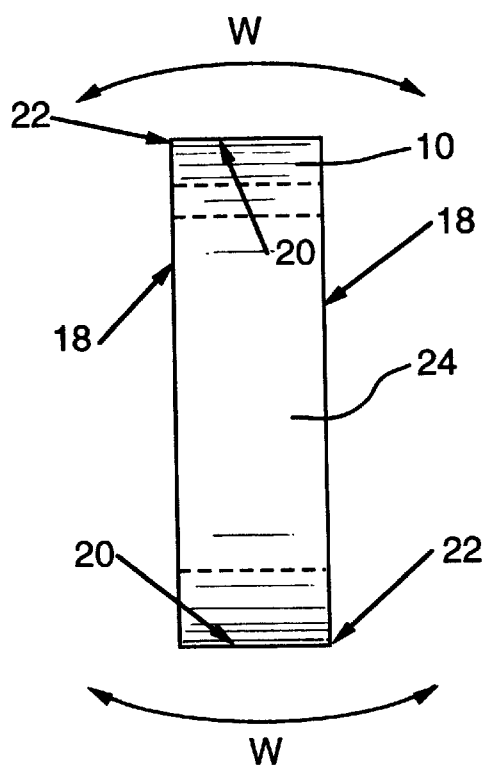
FIG. 9 is an end elevational view of a rotary knife illustrating the run-out operational characteristic thereof.
Figure 10:
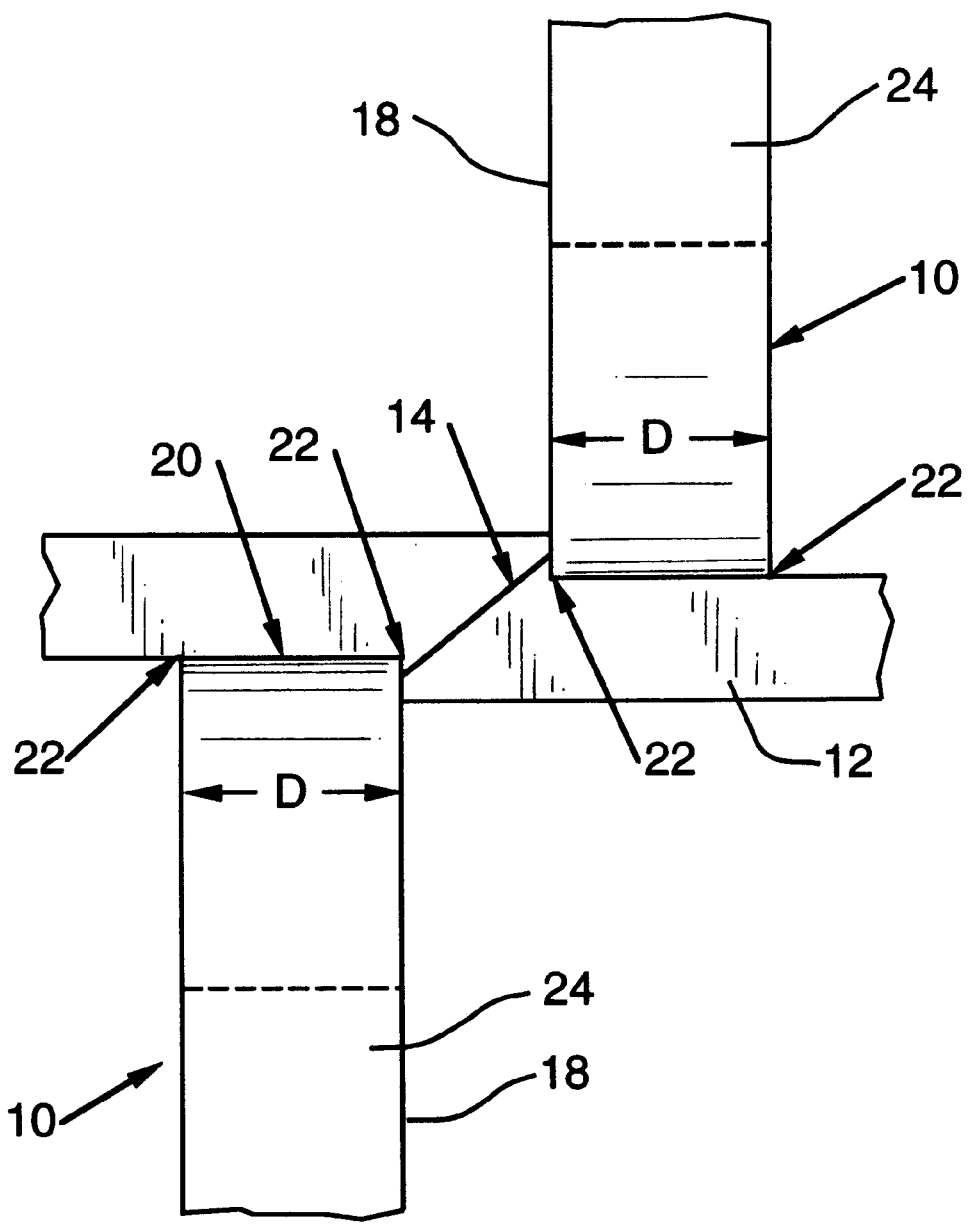
FIG. 10 is an operational view of a pair of rotary knives illustrating the respective deflection operational characteristics thereof.

Additional operational characteristics of the knife 10 are depicted in FIGS. 8–10, which will be discussed in order below.

FIG. 8 depicts the concentricity of the knife 10, which affects the quality of strip-edge produced thereby. As shown, the knife 10 is supported on a keyed shaft 16. If the dimensions Z of the knife 10 are not identical, or if there is too large of a gap, or "slop," between the outside diameter of the shaft 16 and the inside diameter of the bore 24, the knife 10 will oscillate (i.e., move up-and-down) along the directions indicated by Arrows D and U. Such movement by the knife 10 will cause a change in the vertical clearance (see Dimension Y in FIG. 1) between the respective knives in the pair, which may detrimentally affect the quality of the product cut by the knives. In addition, this phenomenon may also be caused by an out-of-round shaft or bad shaft bearings.

The present invention, as described above, may be adapted to detect concentricity problems in knives by forming and analyzing, in real time, images of the sides 18 of the knives 10. By comparing the real-time rotational images of an eccentric knife to those of a knife that is concentric, the analyzer 44 will be able to detect an eccentric knife and alert a line operator to that effect.

Knife wobble or run-out, as depicted in FIG. 9, may also be detected by the present invention. When the sides 18 of a knife 10 are not substantially parallel or are non-linear, the knife 10 has a tendency to wobble, as illustrated by Arrows W in FIG. 9. Knife wobble results in a change in the horizontal clearance (see Dimension X in FIG. 1) between the respective knives in the pair, which can detrimentally affect strip-edge quality.

It is envisioned that knife wobble will be manifested in the images of the knife by a fluctuation in the line (which corresponds to the knife edge 22) formed by the transition between the dark and bright pixels. This fluctuation would most likely appear as a sinusoidal wave in consecutive images of the knife.

Furthermore, knife deflection, as illustrated in FIG. 10, may be detected by the present invention. During a slitting or trimming operation, the strip 12 interacts with the knives 10 and imparts forces thereon. Typically, the knives 10 are forced by the strip 12 to deflect in the directions indicated by Arrows D. If the amount of deflection is too great, the quality of strip-edge cut by the knives may be affected.

By forming continuous images of the knife end 20 while the knife is in use, the movement of the knife 10 in the D direction will be able to be monitored in real time. The deflection will manifest itself by the sides 18 of the respective knife 10 forming sinusoidal waves. If the amplitude of the waves falls outside of operating parameters, the analyzer 44 will alert the line operator of such and the knives 10 will be adjusted or replaced.

Referring now generally to FIGS. 1 and 4, in another preferred embodiment of the present invention the strip edge 14 processed by the knives 10 can also be analyzed to monitor and inspect the various operational characteristics thereof.

Figure 11:
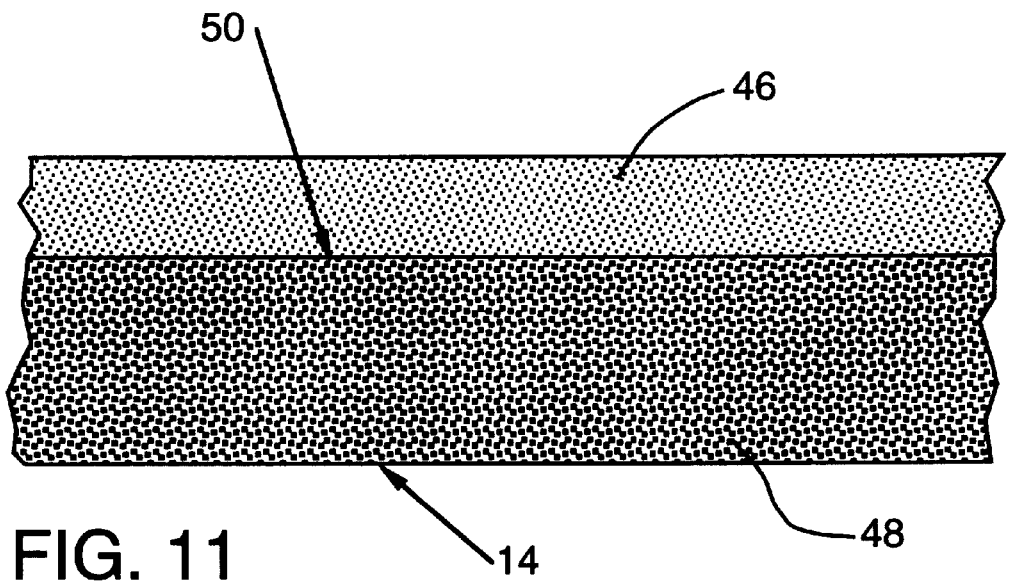
FIG. 11 is a side view of a representative image of a well trimmed strip edge.

FIG. 11 illustrates the nature of the strip edge 14 produced by the knives 10. As shown in FIG. 11, the trimming of the strip 12 is achieved by a combination of slitting and shearing, with the edge 14 exhibiting an upper "nick" or slit region 46 and a lower "break" or shear region 48. The nick and break regions 46, 48 meet along a dividing line 50.

The nick and break regions 46, 48 of the knives 10, and the dividing line 50 therebetween, can be monitored to detect discrepancies therein that would possibly indicate that there is a problem with one or more of the operational characteristics of the knives 10.

Figure 12:
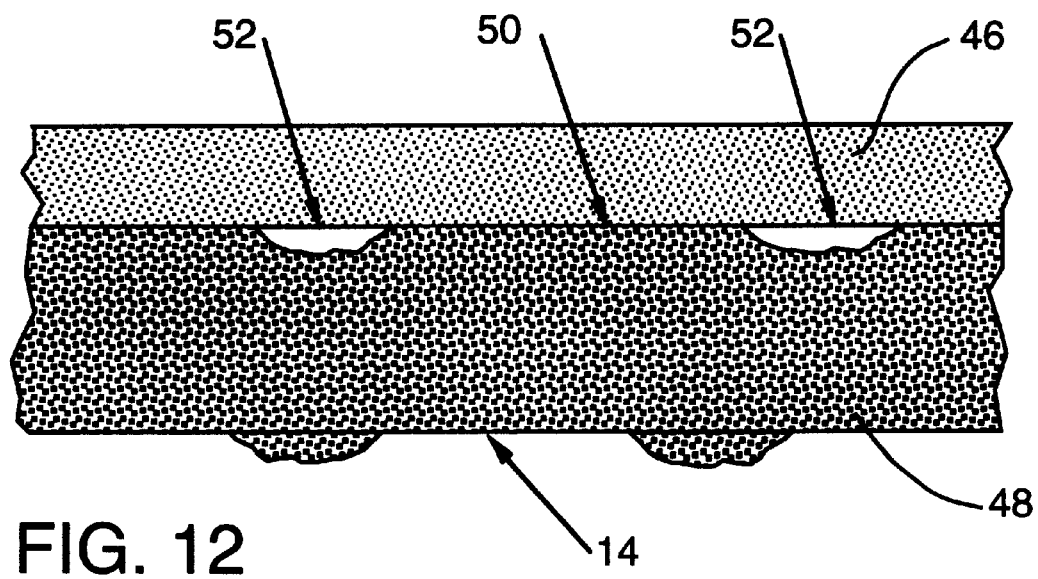
FIG. 12 is a side view of a representative image of a strip edge that was trimmed by a rotary knife having an edge defect therein.

For example, and as discussed above, if the knife edge 22 has a defect 28 therein, the defect 28 will be manifested on the strip edge 14 at a certain periodic interval corresponding to the position of the defect 28 on the knife edge 22. Thus, as shown in FIG. 12, it is anticipated that a defect 28 in the upper knife edge will manifest itself in the nick region 46 of the edge 14 images as discontinuities 52 in the otherwise uniform pixel field thereof.

To monitor and inspect the strip edge 14, one or more image producers 36 are positioned along the strip 12 downstream from the knives 10. The field of views of the one or more image producers 36 will frame at least a major portion of the strip edge 14 to insure accurate monitoring and inspecting of same.

As discussed above, one or more light sources 40 are positioned with the image producers 36 to illuminate the strip edge 14. An analyzer 44 is connectively associated with the image producer 36 to digitize the images of the strip edge 14, and to analyze the image information to determine whether there are discrepancies therein that would be caused by problematic operational characteristics of the knife 10.

As discussed above, if the analyzer 44 determines that a discrepancy or defect exists in one or more operational characteristics of the knife 10, the analyzer 44 will alert the line operator of such. The line operator would then be able to readjust or replace the knife 10 before a significant amount of strip is scrapped or needs to be reprocessed.

While knife edge 22 integrity has been discussed above in relation to monitoring and inspecting strip edge 14 to determine whether a knife edge 22 has a defect 28 therein it is contemplated that the remaining operational characteristics of the knives 10 can also be monitored by inspecting the strip edge 14 processed thereby.

Through empirical studies of the discrepancies of strip edge 14 caused by various problematic operational characteristics of the knife 14, line operators will be able to define preliminary operating parameters for the strip edge 14 and the knife 10, as discussed above. By using the above-described monitoring and inspecting apparatus, an iterative process can be used to refine the preliminary operating parameters and thereby define standard operating parameters for the strip edge 14 and the knife 10.

After the standard operating parameters are defined, the line operator will then be able to rely exclusively on the apparatus and method of the present invention to monitor the strip edge 14 to determine, and possibly even predict, when a respective knife 10 will need to be adjusted or replaced.

The operational characteristics discussed above are intended to illustrate the operation and capabilities of the present invention and are not considered to be comprehensive; many additional operational characteristics of the knife may be monitored and inspected by the present invention.

The image producers 36 and light sources 40 utilized in the present invention may be oriented or positioned in any suitable manner to monitor and inspect one or more operational characteristics of a knife. To operate efficiently, the image producer 36 and the light source 40 have to be positioned such that the relevant surfaces of the knife 10 or strip edge 14 are included within their respective fields of view.

Further, depending on the application and the number of operational characteristics of a knife that are desired to be monitored and inspected, it should be appreciated that any suitable number of image producers 36 and light sources 40 may be used in the present invention. For example, two light sources 40 may be used with a single image producer 36, or vice-versa.

The following instruments may be used in the present invention: the analyzer 44 may comprise a PC-type computer having at least a 66 Mhz 80486 processor, 8 MB of RAM, 2 camera inputs, 16 digital input/output (24 Volts DC) and a 400 MB hard disk; the peripherals for the analyzer 44 may include a SVGA monitor, a keyboard and a mouse; the image producer 36 may comprise a "TM-6" series CCD camera having a 75 mm lens provided by Pulnix; and the light source 40 may be a "Type 800 Microlight" infrared illuminator provided by Dennard.

The present invention, by monitoring in real time the various operational characteristics of knives, allows the knives to be timely adjusted or replaced when they begin to operate outside of normal operating parameters. Such real-time monitoring of the knives may result in longer knife-life and may prevent the unnecessary scrapping or subsequent re-working of strip product.

It should be appreciated that the apparatus and method of the present invention may be configured and conducted as appropriate for the application. The embodiments described above are to be considered in all respects only as illustrative and not restrictive. The scope of the invention is defined by the following claims rather than by the foregoing description. All changes which come with the meaning and range of equivalency of the claims are to be embraced within their scope.

What is claimed is:

1. A method of monitoring one or more operational characteristics of a knife, comprising the following steps:
   providing at least one image producer having a field of view that substantially frames the knife;
   using the at least one image producer to form a first series of images of the knife while the knife is in use;
   analyzing the first series of images to determine whether the one or more operational characteristics of the knife are within one or more preliminary operating parameters;
   forming one or more subsequent series of images of the knife while the knife is in use;
   generating one or more subsequent series of outputs from the one or more subsequent series of images;
   analyzing the one or more subsequent series of outputs to determine whether the one or more operational characteristics of the knife are within the one or more preliminary operating parameters; and
   using the first series of outputs and the one or more subsequent series of outputs to generate one or more standard operating parameters if the one or more operational characteristics of the knife are within one or more preliminary operating parameters.

2. A method of monitoring one or more operational characteristics of a knife, comprising the following steps:
   providing at least one image producer having a field of view that substantially frames an edge of a workpiece that has been processed by the knife;
   using the at least one image producer to form a first series of images of the workpiece edge after the edge has been processed by the knife;
   analyzing the first series of images to determine whether the one or more operational characteristics of the knife are within one or more preliminary operating parameters;
   forming one or more subsequent series of images of the workpiece edge after the edge has been processed by the knife;
   generating one or more subsequent series of outputs from the one or more subsequent series of images;
   analyzing the one or more subsequent series of outputs to determine whether the one or more operational characteristics of the knife are within the one or more preliminary operating parameters; and
   using the first series of outputs and the one or more subsequent series of outputs to generate one or more standard operating parameters if the one or more operational characteristics of the knife are within the one or more preliminary operating parameters.

3. An apparatus for monitoring one or more operational characteristics of a knife, the apparatus comprising:
   at least one image producer having a field of view that substantially frames an edge of a workpiece that has been processed by the knife, said at least one image producer operable to form a first series of images of the workpiece edge after the edge has been processed by the knife;
   an analyzer connectively associated with said at least one image producer, said analyzer operable to determine in real time whether the one or more operational characteristics of the knife are within one or more preliminary operating parameters;
   wherein said at least one image producer is operable to form one or more subsequent series of images of the edge after the edge has been processed by the knife, and further wherein said analyzer is operable to analyze the one or more subsequent series of images to determine whether the one or more operational characteristics of the knife are within the one or more preliminary operating parameters; and
   wherein said analyzer is further operable to generate one or more standard operating parameters if the one or more operational characteristics of the knife are within the one or more preliminary operating parameters.

4. An apparatus for monitoring one or more operational characteristics of a knife, the apparatus comprising:
   at least one image producer having a field of view that substantially frames the knife, said at least one image producer operable to form a first series of images of the knife while the knife is in use; and
   an analyzer connectively associated with said at least one image producer, said analyzer operable to determine in real time whether the one or more operational characteristics of the knife are within one or more preliminary operating parameters;
   said at least one image producer being operable to form one or more subsequent series of images of the knife while the knife is in use, and further wherein said analyzer is operable to analyze the one or more subsequent series of images to determine whether the one or more operational characteristics of the knife are within the one or more preliminary operating parameters;
   said analyzer further being operable to generate one or more standard operating parameters if the one or more operational characteristics of the knife are within the one or more preliminary operating parameters.

5. In combination, a rotary knife and an apparatus for monitoring one or more operational characteristics of said rotary knife, wherein:

said rotary knife comprises a substantially uninterrupted cutting edge extending over a significant portion of the periphery of the knife; and said apparatus comprises:

at least one image producer having a field of view that substantially frames the knife, said at least one image producer operable to form a first series of images of the knife while the knife is in use;

said at least one image producer being adapted to view at least a portion of said cutting edge; and an analyzer connectively associated with said at least one image producer, said analyzer operable to determine in real time whether the one or more operational characteristics of the knife are within one or more preliminary operating parameters;

said at least one image producer being operable to form one or more subsequent series of images of the knife while the knife is in use, and said analyzer further being operable to analyze the one or more subsequent series of images to determine whether the one or more operational characteristics of the knife are within the one or more preliminary operating parameters;

said analyzer further being operable to generate one or more standard operating parameters if the one or more operational characteristics of the knife are within the one or more preliminary operating parameters.

6. In combination, a rotary knife adapted to cut metal into strip and an apparatus for monitoring one or more operational characteristics of said rotary knife, the apparatus comprising:

at least one image producer having a field of view that substantially frames an edge of a strip metal workpiece that has been cut by said rotary knife, said at least one image producer operable to form a first series of images of the workpiece edge after the edge has been cut via the knife; and an analyzer connectively associated with said at least one image producer, said analyzer operable to determine in real time whether the one or more operational characteristics of the knife are within one or more preliminary operating parameters;

said at least one image producer being operable to form one or more subsequent series of images of the edge after the edge has been processed by the knife, and said analyzer further being operable to analyze the one or more subsequent series of images to determine whether the one or more operational characteristics of the knife are within the one or more preliminary operating parameters;

said analyzer further being operable to generate one or more standard operating parameters if the one or more operational characteristics of the knife are within the one or more preliminary operating parameters.

7. The method of claim 1, further comprising the steps of:

comparing one or more second subsequent series of outputs to the one or more standard operating parameters;

determining whether the one or more operational characteristics of the knife are within the one or more standard operating parameters; and alerting an operator if the one or more operational characteristics of the knife are not within the one or more standard operating parameters.

8. The method of claim 1 wherein the at least one image producer provided in step (a) comprises two or more image producers.

9. The method of claim 1 wherein the at least one image producer provided in step (a) comprises a camera.

10. The method of claim 1 wherein the first series of images formed in step (b) comprises a series of video images.

11. The method of claim 1 wherein the step of analyzing comprises analyzing the first series of images in real-time.

12. The method of claim 1 wherein the one or more operational characteristics of the knife is selected from the group consisting of: knife edge sharpness; knife edge integrity; knife concentricity; knife wobble; knife material pick-up; knife edge wear; and knife deflection.

13. The method of claim 12 wherein the field of view of the at least one image producer provided in step (a) frames substantially an edge of the knife when the one or more operational characteristics is selected from the group consisting of: knife edge sharpness, knife edge wear, and knife edge integrity.

14. The method of claim 1 wherein the one or more preliminary operating parameters of the knife is selected from the group consisting of: knife edge sharpness; knife edge integrity; knife concentricity; knife wobble; knife material pick-up; knife edge wear; and knife deflection.

15. The apparatus of claim 4 wherein said analyzer is further operable to determine whether the one or more operational characteristics of the knife are within the one or more standard operating parameters.

16. The apparatus of claim 4 wherein said at least one image producer comprises two or more image producers.

17. The apparatus of claim 4 wherein said at least one image producer comprises a camera.

18. The apparatus of claim 4 wherein the first series of images comprises a series of video images.

19. The method of claim 2 wherein the step of analyzing comprises:

generating a first series of outputs from the first series of images;

comparing the first series of outputs to the one or more preliminary operating parameters;

determining whether the one or more operational characteristics of the knife are within the one or more preliminary operating parameters; and alerting an operator if the one or more operational characteristics of the knife are not within the one or more preliminary operating parameters.

20. The method of claim 2, further comprising the steps of:

comparing one or more second subsequent series of outputs to the one or more standard operating parameters;

determining whether the one or more operational characteristics of the knife are within the one or more standard operating parameters; and alerting an operator if the one or more operational characteristics of the knife are not within the one or more standard operating parameters.

21. The method of claim 2 wherein the at least one image producer provided in step (a) comprises two or more image producers.

22. The method of claim 2 wherein the at least one image producer provided in step (a) comprises a camera.

23. The method of claim 2 wherein the first series of images formed in step (b) comprises a series of video images.

24. The method of claim 2 wherein the step of analyzing comprises analyzing the first series of images in real-time.

25. The method of claim 2 wherein the one or more operational characteristics of the knife comprises knife edge integrity.

26. The apparatus of claim 3 wherein said analyzer is further operable to determine whether the one or more operational characteristics of the knife are within the one or more standard operating parameters.

27. The apparatus of claim 3 wherein said at least one image producer comprises two or more image producers.

28. The apparatus of claim 3 wherein said at least one image producer comprises a camera.

29. The apparatus of claim 3 wherein the first series of images comprises a series of video images.

* * * * *